AUTOMATIC RECORD CHANGER AND PLAYER

Filed June 28, 1956

11 Sheets-Sheet 1

Inventor
Arnold P. Grunwald
[signature]
Attorney

Inventor
Arnold P. Grunwald
Jack [signature]
Attorney

Inventor
Arnold P. Grunwald
Jack E. Donato [signature]
Attorney

Aug. 2, 1960 A. P. GRUNWALD 2,947,542

AUTOMATIC RECORD CHANGER AND PLAYER

Filed June 28, 1956 11 Sheets-Sheet 4

Inventor
Arnold P. Grunwald
Jack E. Dominik
Attorney

Aug. 2, 1960 A. P. GRUNWALD 2,947,542

AUTOMATIC RECORD CHANGER AND PLAYER

Filed June 28, 1956 11 Sheets-Sheet 5

Inventor
Arnold P. Grunwald

Attorney

Inventor
Arnold P. Grunwald
[signature]
Attorney

Inventor
Arnold P. Grunwald
Jack E. Dominik
Attorney

AUTOMATIC RECORD CHANGER AND PLAYER

Filed June 28, 1956

Inventor
Arnold P. Grunwald

Attorney

Inventor
Arnold P. Grunwald
Jack Dominik
Attorney

Aug. 2, 1960 A. P. GRUNWALD 2,947,542

AUTOMATIC RECORD CHANGER AND PLAYER

Filed June 28, 1956 11 Sheets-Sheet 10

Inventor
Arnold P. Grunwald
Jack E. Dominik
Attorney

Aug. 2, 1960

A. P. GRUNWALD 2,947,542

AUTOMATIC RECORD CHANGER AND PLAYER

Filed June 28, 1956

11 Sheets-Sheet 11

Inventor
Arnold P. Grunwald
Jack ...
Attorney

United States Patent Office 2,947,542

Patented Aug. 2, 1960

2,947,542

AUTOMATIC RECORD CHANGER AND PLAYER

Arnold P. Grunwald, Chicago, Ill., assignor to Capital Engineering & Manufacturing Corporation Filed June 28, 1956, Ser. No. 594,509

11 Claims. (Cl. 274—10)

The present invention relates to an automatic record changer and player. Its principal utility is found in playing circular phonograph records.

Conventional phonograph record changers have largely become standardized in principle. Particularly is this so with regard to the method of cycling the pickup arm. Conventionally the pickup arm is cycled by the rotation of a three dimensional cam which engages the tone arm in timed relation to the engagement of the stylus with the run out groove of the associated record. The three dimensional cam and its associated driving linkage are at best complex. This increases both the cost of the unit and the probability of failure. In addition, the pivotal motion of conventional record changer pickup arms induces magnified inertia loads which can be accommodated only by a slowly moving mechanism or an extremely rigid and precise structure. The latter alternative is costly. The former, and accepted solution, introduces a substantial delay in playing while the records are being changed.

Also, because the conventional record changers employ a clock work type of drive, the turntable support spindle must be small. The spindle being small in relation to the size of the turntable, the rigidity of the turntable support afforded by the spindle bearing is reduced. This lack of rigidity induces a rumble into the pickup which is undesirable.

In view of the foregoing, it is the general object of the present invention to provide a simplified pickup arm and cycling mechanism for an automatic record changer which is inexpensive to construct and yet exhibits superior reproduction characteristics.

Another object of the invention is to provide a pickup arm suspension and cycling mechanism for an automatic record changer with a simplified spatial relationship of component parts permitting a wide latitude of design freedom in adding accessories and controls.

A related and more detailed object of the invention is to employ the forces of gravity to motivate the lateral transfer of the stylus thereby eliminating the necessity for a positive drive of this phase of the cycle.

Still another object of the invention is to provide an automatic record changer with a tone arm and turntable relationship which ensures a rigidity of the order demanded by the highest fidelity of reproduction.

Yet another object of the invention is to furnish an automatic record changer which is adaptable to both radial and pivotal tone arms.

Still a further object of the invention is to provide an automatic record changer which achieves all of the foregoing objectives and is still inexpensive to manufacture and maintain.

Further objects and advantages of the present invention will become apparent as the following description of two illustrative embodiments proceeds, taken in conjunction with the accompanying descriptive drawings in which.

Conventionally the operational phases involved in the cycling of an automatic record changer fit into the following pattern:

(1) Stacking records above the turntable.
(2) Dropping a record onto the turntable.
(3) Engaging the record by the needle of the tone arm and playing the record.
(4) Disengaging needle.
(5) Retracting the tone arm out of the playing area.
(6) Dropping the next record.
(7) Transferring tone arm and needle for re-engaging the record.

The present invention stems from the discovery that the forces of gravity may be employed to transfer the tone arm and needle to re-engage the record. This result is achieved by orienting the locus of the retracting mechanism to remain in equilibrium while the record is being played, but to induce a gravity inspired migration of the tone arm toward the periphery of the record upon retraction.

THEORY OF OPERATION

*Environment*

Figure 1:
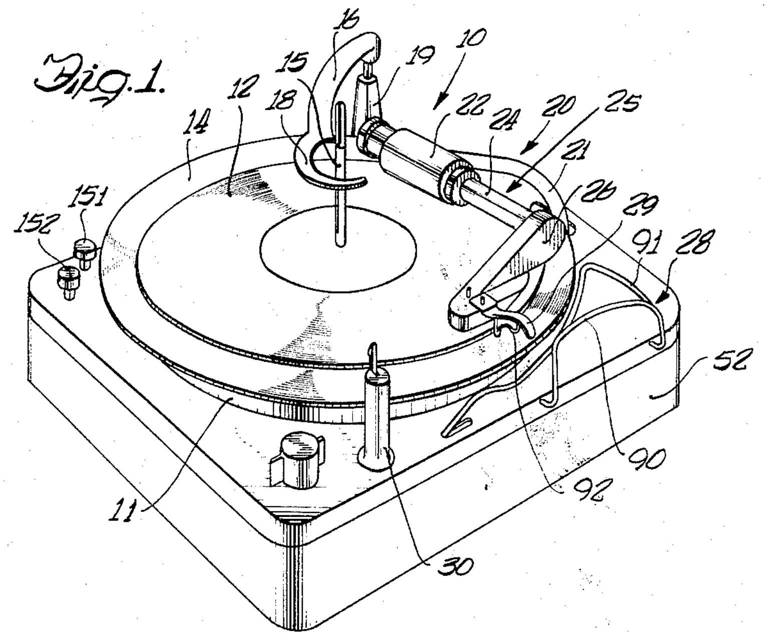
Figure 1 is a perspective view of the illustrative record changer.

Because the record changer as contemplated by the invention is intended for use with a standard disc type record, certain of its features will be those familiarly associated with the conventional type record changer. The operation of the record changer will be better understood as this environment is set forth. Referring now to Fig. 1, it will be seen that the automatic record player assembly 10 contemplates a disc-like turntable 11 upon which a disc-like record 12 is the familiar 10-inch variety, the record 14 beneath it being the exemplary of the 12-inch variety. A secondary spindle 15 extends upwardly from the turntable 11 and serves the two-fold function of supporting a stack of records for sequential play as well as orienting the records centrally on the turntable 11. The records are held in place on the stack on the spindle 15 by means of a stabilizer 16 which is shown in the form of an arcuate arm having a hooked end portion 18 supported by a stabilizer support housing assembly 19.

The unique portion of the automatic record changer assembly 10 is focused on the swing arm assembly 20. The swing arm assembly 20 contemplates a swing arm 21 at the head end of which is fixed a tone arm support bearing assembly 22. The tone arm assembly 25 is slidably mounted within the tone arm support assembly 22 through which the tone arm assembly support shaft 24 extends. The pickup head 26 is secured at the outer end of the tone arm support shaft 24 and includes a cartridge stylus at its outer end portion. The return of the pickup head to the records for successive playing is assisted by the intermixing guide rail assembly 28 which cooperates with the guide rail engaging finger assembly 29 secured to the pickup head 26. A sizing finger assembly 30 relates the intelligence picked up by it from various sizes of records to a shifting of the guide rail assembly to assure adequate intermixing.

*Axial alignment*

In the record changer assembly 10 using a radial tone arm, the angularity of the pivotal axis of the swing arm assembly 20 is both rotated in the horizontal plane and tilted in the vertical plane. The angularity of rotation and tilt is with relation to the mean effective of the playing locus of the stylus or playing needle 31. In the case of the radial tone arm, such as shown in the preferred embodiment, the mean effective playing locus of the stylus or playing needle is a radial of the record. In the case of pivoted tone arms, such as shown in the alternative embodiment portrayed in Figs. 28 through 31, the mean effective playing locus of the stylus is defined as that straight line which most closely approximates the travel of the stylus or playing needle while engaging the playing grooves of the record. Normally with a pivoted tone arm, the arm is so proportioned and its pivot center so located as to orient the mean effective playing locus of the stylus along a radial of the record. Obviously, however, since the pivoted arms are at best a compromise to reduce tracking error, the mean effective playing locus would vary for the same arm depending on whether a 10-inch or 12-inch record is being played.

Figure 12:
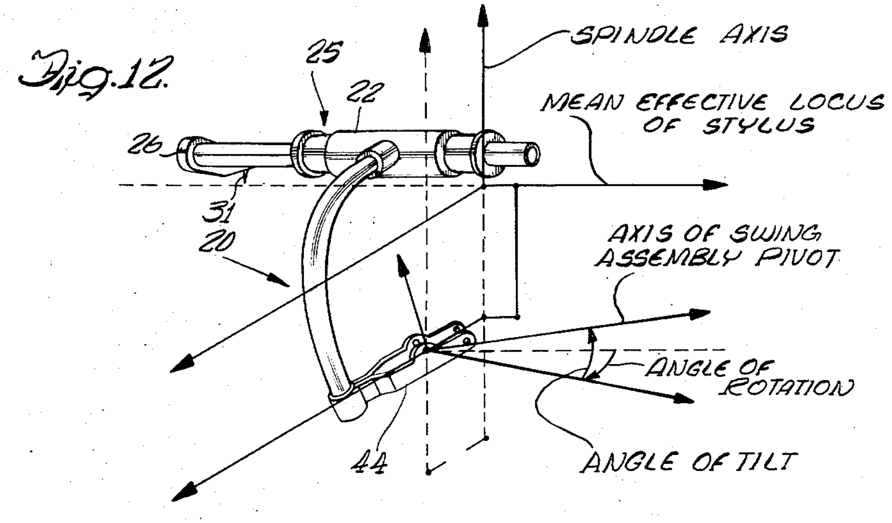
Fig. 12 is a diagrammatic perspective view showing the orientation of the axis of rotation of the swing arm assembly.

Referring now to Fig. 12, it will be seen that the spindle axis is perpendicular to the mean effective locus of the stylus. The swing arm assembly 20 pivots about an axis which is both tilted and rotated with respect to the mean effective playing locus of the stylus. The rotation is effected in a plane parallel with that of the turntable while the angle of tilt is achieved in a plane perpendicular with that of the turntable. As will become more apparent in the description of the operation of the record changer, the principal purpose of the angle of rotation is to reorient the center of gravity of the tone arm assembly 25 upon retraction of the swing arm assembly 20 to enable the forces of gravity to carry the stylus 31 to a preselected position approximating the periphery of the record to be played. The two-fold purpose of the angle of tilt is to confine the motion of the swing arm assembly 20 and the tone arm assembly 25 to a compact area and to flatten the engagement trajectory of the stylus 31 into an elliptical trace on a vertical plane, thereby reducing the inertia load absorbed by the record and stylus upon playing engagement.

Although the motion achieved by employing the angle of tilt is highly desirable from a design as well as operational standpoint, it is not as essential to the successful operation of the record changer as the employment of angle of rotation, since the gravitational motivation of the lateral transfer of the stylus is dependent upon the angle of rotation. It is, however, geometrically possible to achieve an equivalent effect of the angle of rotation through the angle to tilt whereby, upon retraction of the swing arm assembly 20, the axis of the tone arm support assembly 22 is tilted downwardly thereby inviting the forces of gravity to motivate the lateral transfer of the stylus. This action is contemplated as following within the scope of the invention, but is not a preferred construction.

*Operational motion*

Figure 13:
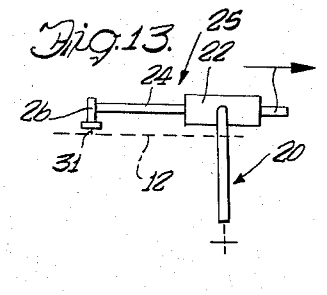
Figs. 13 through 22 are diagrammatic illustrations of the movement of the swing arm and tone arm during the various stages of record play and changeover, the odd-numbered figures showing the tone arm and swing arm assembly in a rear view and the even numbered figures showing the tone arm in swing arm assembly as viewed from an end thereof.
Figure 14:
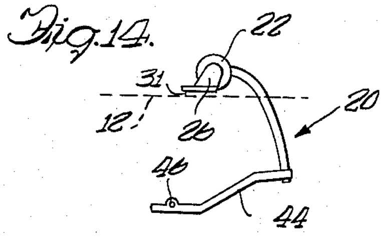

The details of construction which utilize the principle of the invention will be better understood in the light of the motion of the swing arm assembly about its axis. This motion is shown diagrammatically in sequence in Figs. 13 to 22 of the drawings. In Fig. 13 the swing arm assembly 20 is oriented with the pickup head 26 out near the periphery of the record 12 so that the stylus or needle 31 is in the normal starting position. As the record continues to play the pickup head support shaft 24 moves inwardly through the bearing support assembly 22 as indicated by the arrow in Fig. 13.

Figures 15, 17:
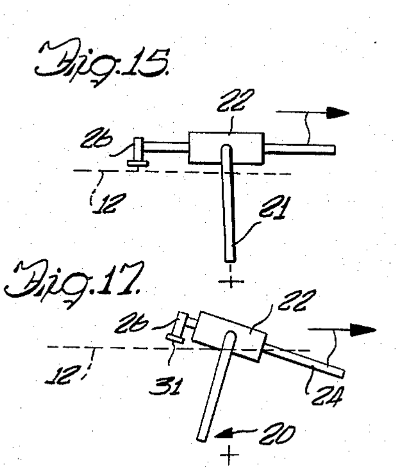
Figures 16, 18:
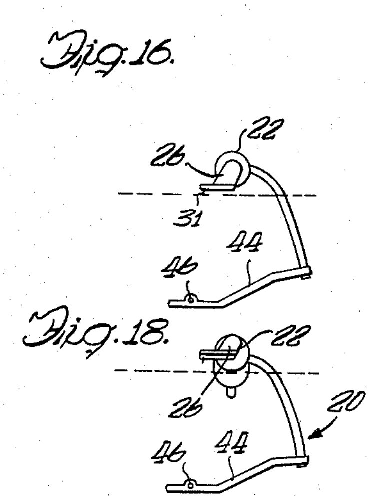
Figure 19:
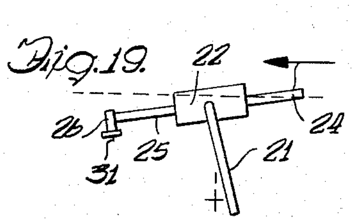
Figure 20:
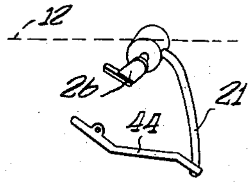
Figure 21:
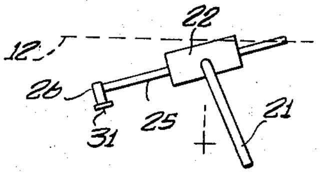
Figure 22:
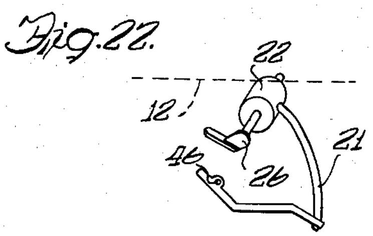

As the playing of the record continues, as illustrated in Fig. 15, the center of gravity of the tone arm assembly 25 shifts closer to the bearing support assembly 22 as the tone arm support shaft 24 extends further through the bearing support assembly 22. At a preselected position, the center of gravity of the tone arm assembly 25 passes through the center of balance of the swing arm assembly 20, and causes the unit to flop over as shown in Fig. 17. This action, in the preferred embodiment, trips a switch which energizes the swing arm assembly power unit to retract the swing arm assembly. Upon retraction, the angle of rotation of the swing arm assembly pivot causes the tone arm support shaft 24 to tilt downwardly as shown in Fig. 19.

The downward tilt of the tone arm support shaft 24 permits the weight of the tone arm assembly 25 to cause the tone arm shaft 24 to slide through the bearing support assembly 22 thereby transferring the pick-up head 26 and its associated stylus 31 to a position approximating the periphery of the next intended record for play. As will be described in detail hereinafter, suitable guide means are employed to orient the peripheral location of the pickup head 26 and its associated needle head 31 while the swing arm assembly 30 is allowed to return from the retraction to its playing position.

The end views shown in Figs. 14, 16, 18, 20, and 22 illustrate the action of the swing arm assembly pivotal action which corresponds respectively to the position shown in Figs. 13, 15, 17, 19 and 21.

It is contemplated that other switching techniques may be employed to energize the swing arm drive at the run-out portion of the record thereby eliminating the necessity for the flopping action to trip the swing arm assembly actuating switch as illustrated in Fig. 17. For example, a switching element oriented within the tone arm support shaft 24 could make contact upon arriving at a preselected relationship with a bearing support assembly 22. In addition it is contemplated that an impact sensitive switch could be employed to translate the reciprocatory motion of the tone arm support shaft 24 when the stylus 31 is in the run-out groove of the record to energize the swing arm assembly retraction drive means. Such switching devices are contemplated as the equivalents of the mechanism to be described in detail hereinafter.

CONSTRUCTION

*Swing arm and tone arm*

The tone arm assembly shown is described in substantially greater detail in my co-pending application, Serial Number 566,474, filed February 20, 1956, and the advantageous operational characteristics of this type of tone arm will be fully appreciated from the statements contained therein. For purposes of understanding the record changer, it will become apparent that the tone arm assembly 25 must be mounted within the tone arm support assembly 22 for rotational as well as lateral motion with a minimum of friction. The rotational movement of the tone arm assembly 25 is constrained within limits by the bearing assembly 22 to approximately 6° down from the horizontal and 20° upward from the horizontal, these limits not being critical to the present invention.

Figures 9, 10:
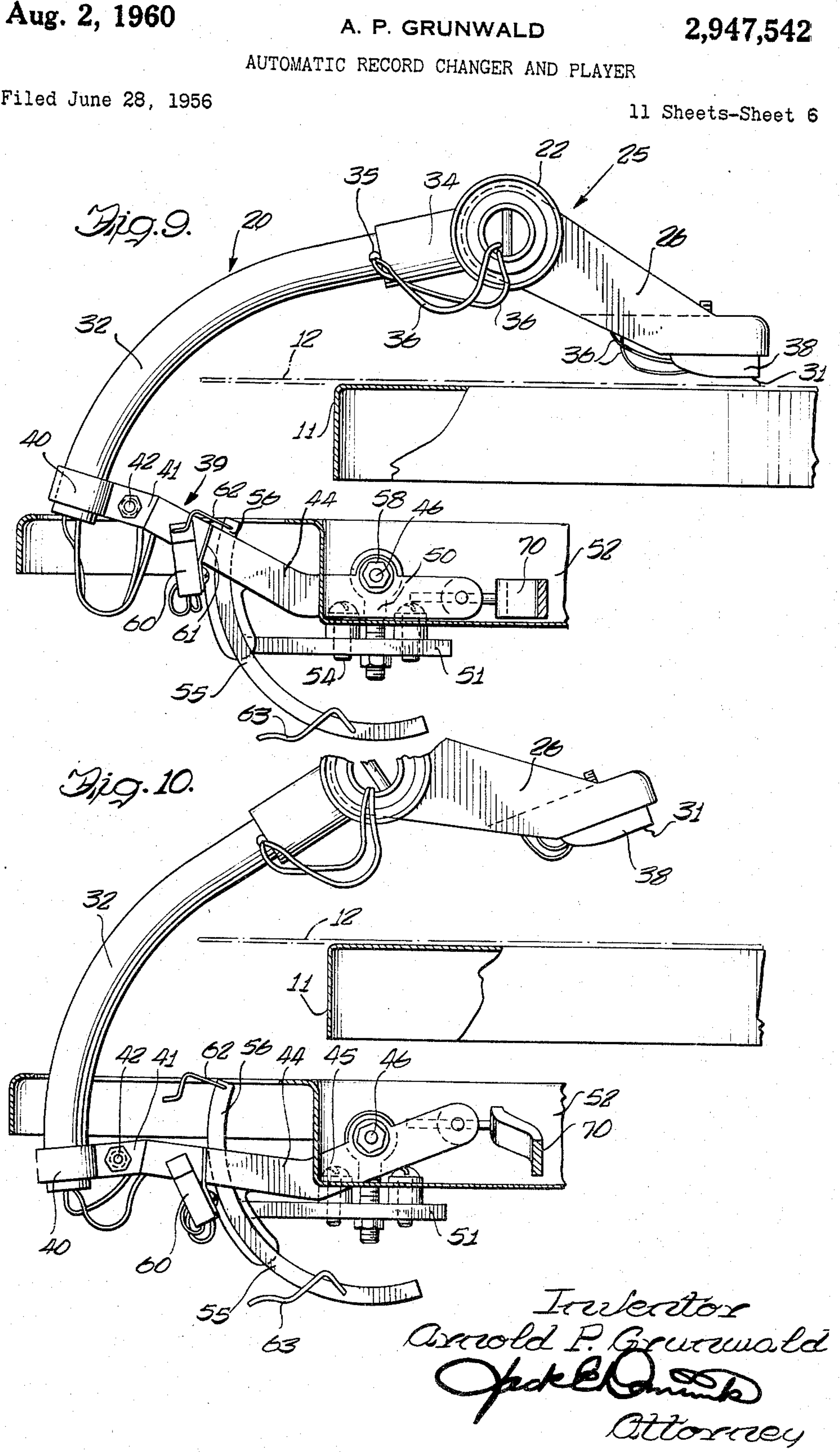
Fig. 9 is an enlarged partial section showing the swing arm support assembly taken along section line 9—9 of Fig. 3, the tone arm and stylus being shown in the engaged position on a record.
Fig. 10 is a view similar to Fig. 9 in which the swing arm assembly has been partially retracted.

Referring now to Fig. 9, it will be seen that the swing assembly 20 contemplates a tubular swing arm 32 which is fixed to an extension 34 of the bearing support assembly 22 at its upper end. An outlet port 35 is provided in the side of the swing arm 32 leading the pickup cartridge wires 36 through the tone arm support shaft 24 to the pickup head 26 and its associated cartridge 38.

At its lower end, the swing arm 32 is secured to the swing arm pivot assembly 39 by means of a collar 40 fastened at its parallel ends 41 by means of the nut and bolt assembly 42. The swing arm pivot yoke 44 has a pair of parallel legs 45 which are traversed by pivot shaft 46 at a mid-portion. As will be seen in Fig. 11 the pivot 46 for the swing arm yoke 44 is secured at one end by means of nut 48 and enlarged head at its other end. A supporting shaft 50 having an eye portion 51 as its upper end journals the pivot 46. The swing arm support shaft 50 is, in turn, secured to a support plate 51. The support plate 51 is fixed to the frame 52 of the record changer by means of machine bolts 54. In this manner, the pivot 46 for the entire swing arm assembly 20 is securely oriented with reference to the turntable 11 and its associated record 12.

An arcuate swing arm guide rail 55 is secured to the mounting plate 51 by welding, or may be integrally cast or otherwise fabricated. The swing arm assembly guide rail 55 is tapered at its upper portion 56, thereby permitting a flopping action of the swing arm support yoke 44 when the swing arm assembly 20 is in its normal or playing position. The eye 51 of the swing support pivot 50 is provided with a ball joint 58 which permits a limited universal pivoting of the swing arm assembly 20 in the normal playing position by properly proportioning the tapered upper end portion 56 of the swing arm assembly guide rail 55, the permissible lateral pivot of the swing arm assembly can be constrained to the area opposite the pickup head side of the swing arm 32.

Figure 3:
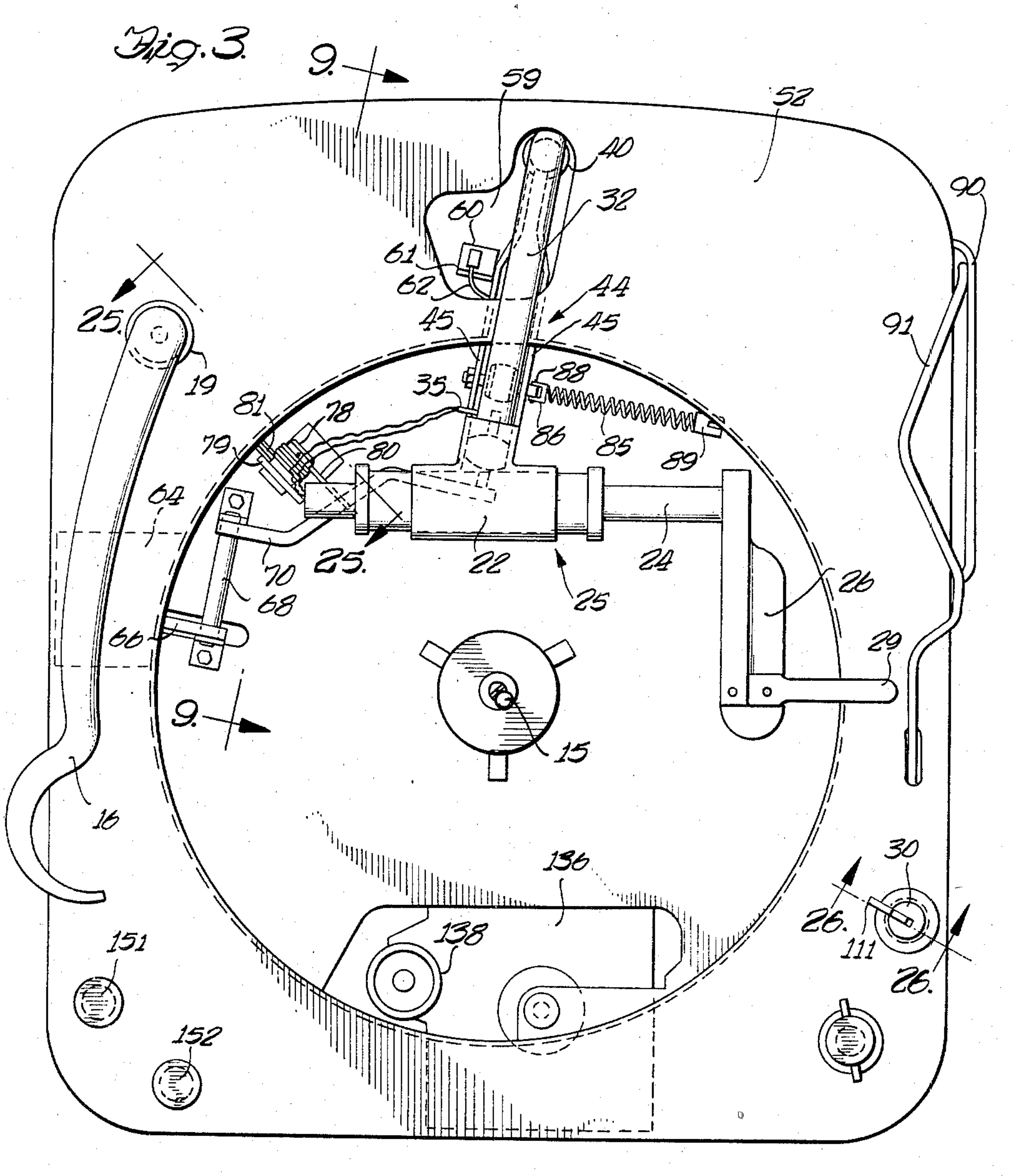
Fig. 3 is a top view of the record changer shown in Fig. 2 in enlarged scale with the turntable removed.

As illustrated in Fig. 3, a recessed portion 59 is provided in the frame assembly 52 to accommodate the flopping action of the swing arm 32 and its associated support 40.

A snap action switch 60 is secured to the support yoke assembly 44 by means of a bracket 61. A snap action switch control finger 62 is fixed to the upper portion 56 of the swing arm assembly guide rail 55.

When, as illustrated in Fig. 17, the center of gravity of the tone arm assembly 25 flops the unit laterally through the action of the universal joint 58, the snap action switch 60 is actuated by means of the finger 62, thereby energizing the source of power which retracts the swing arm assembly 20.

*Swing arm assembly power mechanism*

Figures 23, 24, 25, 26:
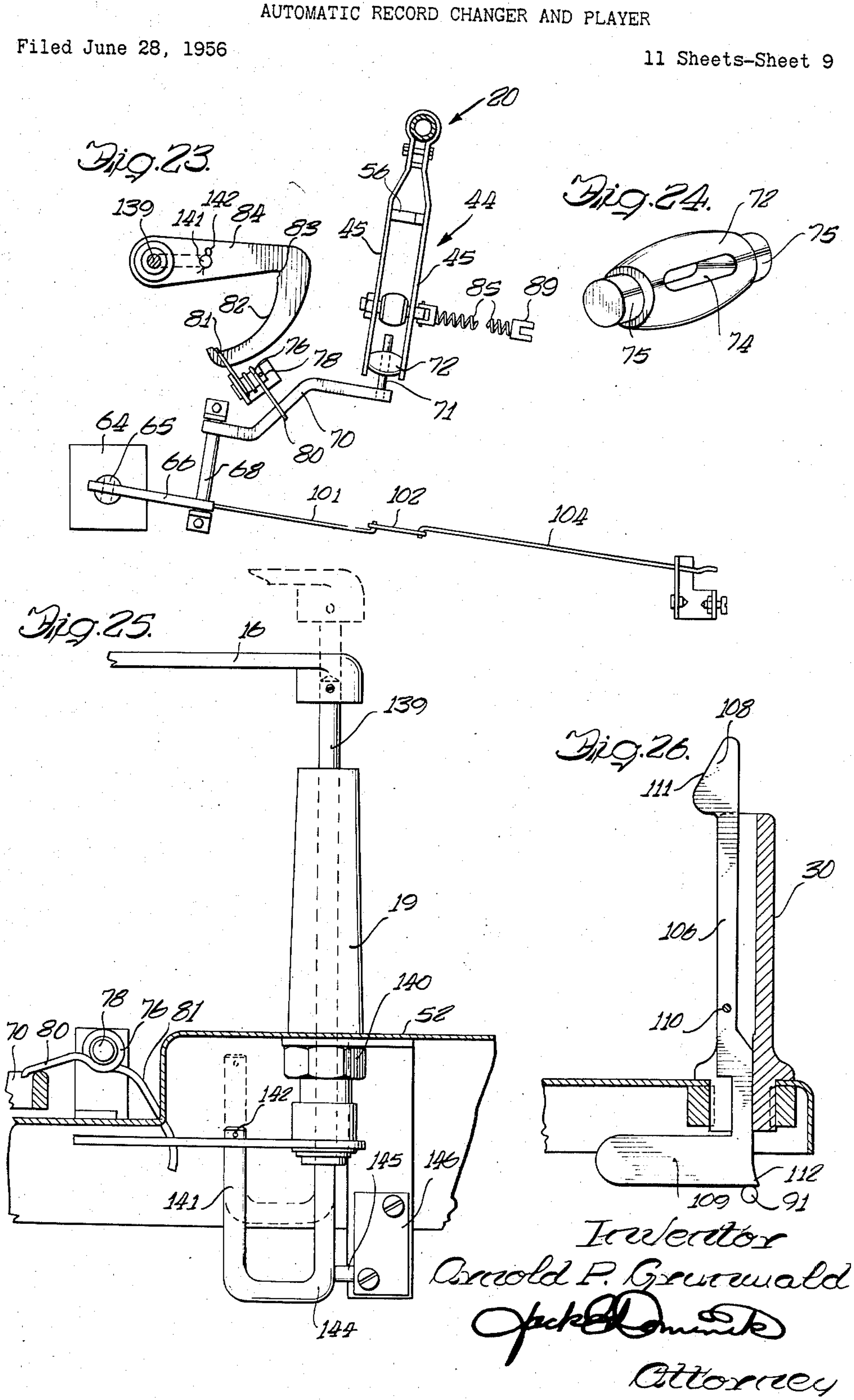
Fig. 23 is an assembled view of the component parts which accomplish the record dropping function as well as the power driven retraction of the swing arm assembly.
Fig. 24 is a perspective view of the universal coupling employed in the drive mechanism of Fig. 23.
Fig. 25 is an enlarged partial sectional view showing the record stabilizer support housing and shut-off mechanism taken along section line 25—25 of Fig. 3.
Fig. 26 is a partial sectional view in enlarged scale of the record sizing finger construction taken along section 26—26 of Fig. 3.

When the snap action switch 60 is activated by the control finger 62 a solenoid 64 is energized (see Fig. 23). The solenoid plunger 65 drives an L-shaped arm 66 which is securely fixed at the intersection of its legs to a transverse drive shaft 68. The lower end 69 of the L-shaped drive arm 66 actuates the record release on the spindle as will be described hereinafter. The transverse drive shaft 68, however, is secured to a dog leg drive 70 with a yoke driving pin 71 at its end. The yoke driving pin 71 engages a modified ball joint 72 which is straddled by and pivotally secured to the yoke assembly 44 between the legs 45 at their central portion. As will be seen in Fig. 24 the modified ball joint 72 has a laterally central slot 74 and a pair of trunnion ends 75 which are journaled between the legs 45 of the yoke assembly 44 as described above.

In review, upon the energizing of the solenoid 64 by means of snap action switch 60, the L-shaped arm 66 drives the transverse shaft 68 in turn transmitting its rotational motion into a vertical component at the end of the dog leg arm 70 raising the upper portion of the yoke assembly 44 which retracts the swing arm assembly 20.

In order to ensure a uniform return of the swing arm assembly and its associated stylus 31 to the playing area on the record 12, a dual spring assembly is cocked in the course of the retraction. As will be seen in Figs. 3, 11, and 23 a single coil spring 76 is wound around a spring support shaft 78 which is in turn secured by means of a support shaft bracket 79 to frame 52 of the record changer. One leg 80 of the helical torsion spring 76 is hooked to the angled portion of the dog lever 70 to receive a tensioning motion when the solenoid 64 is energized and the dog leg lever 70 moves upwardly. The other leg 81 of the helical torsion spring 76 is hooked against a cammed face 82 of the J-shaped lockout arm 84.

Simultaneously with the tensioning of the helical torsion spring 76, the rotation of the yoke assembly 44 about the pivot pin 46 also tensions a helical spring 85 which is mounted co-axially with the pivot pin 46, the one end of the helical spring 85 being fixed to a yoke assembly 86 which is pinned by means of pin 88 to the extension 49 of the pivot pin 46, and its other end being anchored by means of an anchor yoke 89 to the frame 52 of the record changer.

The employment of dual tension springs is desirable in order to provide a continuous return action of the swing arm assembly 20. Because the moment tensioning the helical torque spring 76 by means of the dog leg lever 70 varies throughout the retraction and similarly throughout the return, the cocking force and the return force transmitted to and from the spring will vary throughout the cycle. Although the torque spring 85 has straight line characteristics, the gravitational moment applied to the swing arm assembly 20 varies throughout the cycle. Thus the combination of the torsional moment and gravitational moment is not straight line in character. This varying moment is proportionally balanced between the action of the two springs so that the return portion of the cycle is straight line in character.

Referring now to Figs. 9 and 10 it will be seen that a cut-off control finger 63 has been provided at the lower portion of the arcuate guide rail 55 to throw the snap action switch 60 into the off position when full retraction of the swing arm assembly 20 has been achieved. After the snap-action 60 is turned off, the solenoid 64 is de-energized thereby permitting the dual action of the torque springs 76, 85 to return the swing arm assembly 20 back to the playing position.

*Stylus return and variable sized records intermixing*

After the swing arm assembly 20 has been fully retracted, and the return cycle begins, it becomes essential to orient the position of the stylus or playing needle 31 in such a manner that it will engage the record 12 for play at the appropriate lead portion of the record. Here it will be remembered that most records contemplate a peripheral rim of un-cut material which precedes the cut or playing area of the record as the needle moves inwardly. A lead-in groove is normally provided in the starting rim of the record in similar fashion with the run-out groove which is provided in the secondary portion of the record. Consequently it is desirable to engage the needle or stylus 31 in the lead-in rim in such a manner that the needle will contact the lead-in groove which in a few revolutions of the turntable will start to play.

For this purpose a guide rail assembly 28 is provided at the external portion of the frame 52 which co-acts with a guide rail engaging finger 29 secured to the pick-up head 26. As will be seen in Fig. 1, the guide rail assembly 28 contemplates an outer or 12-inch rail 90 and inner or 10-inch rail 91. The function of the two guide rails is to engage the guide rail shoe 92 on the guide rail finger assembly 29. The guide rail shoe 92 has an inverted L-shaped base 94 defining a corner 95. The guide rails engage the guide rail shoe 92 at the corner 95 (see Fig. 5).

Before going into the detailed operation of the two guide rails, it will be helpful to understand their function. Just before complete retraction of the swing arm assembly 20 is achieved, the pickup head 26 moves outwardly away from the tone arm support bearing assembly 22. The lateral travel of the pickup head 26 is limited when the guide rail shoe 92 contacts the guide rail. Assuming that the inner guide rail 91 is dropped to the inactive position, the guide rail shoe 92 contacts the stirrup-shaped outer guide rail 90. As the return of the swing arm assembly 20 begins, the corner 95 of the guide rail shoe 92 rides on the curved upper portion of the guide rail 90 which is oriented to move the pickup head 26 and its associated stylus 31 into position immediately over the lead-in rim of the larger or 12-inch record 14. Similarly, if a 10-inch record 12 is to be played, the inner guide rail 91 is shifted upwardly into position so that the guide rail shoe contacts the inner guide rail 91 at the end of the outward travel of the pickup head 26. The inner guide rail 91 then delivers the pickup head on its return stroke into such a position that the stylus 31 contacts the lead-in rim of the smaller or 10-inch record 12. It will be appreciated that a wide variety of guide rail shoe constructions 92 and guide rail assemblies 90 may be employed. In the event that the lateral travel of the pickup head 26 is limited by means of a stop associated with the tone arm support bearing assembly 22, then the external guide rail 90 may be eliminated. In order to intermix two sizes of records, however, at least one shiftable guide rail assembly is desirable. In the present instance, guide rail assembly 91 will serve to illustrate this principle.

Figure 4:
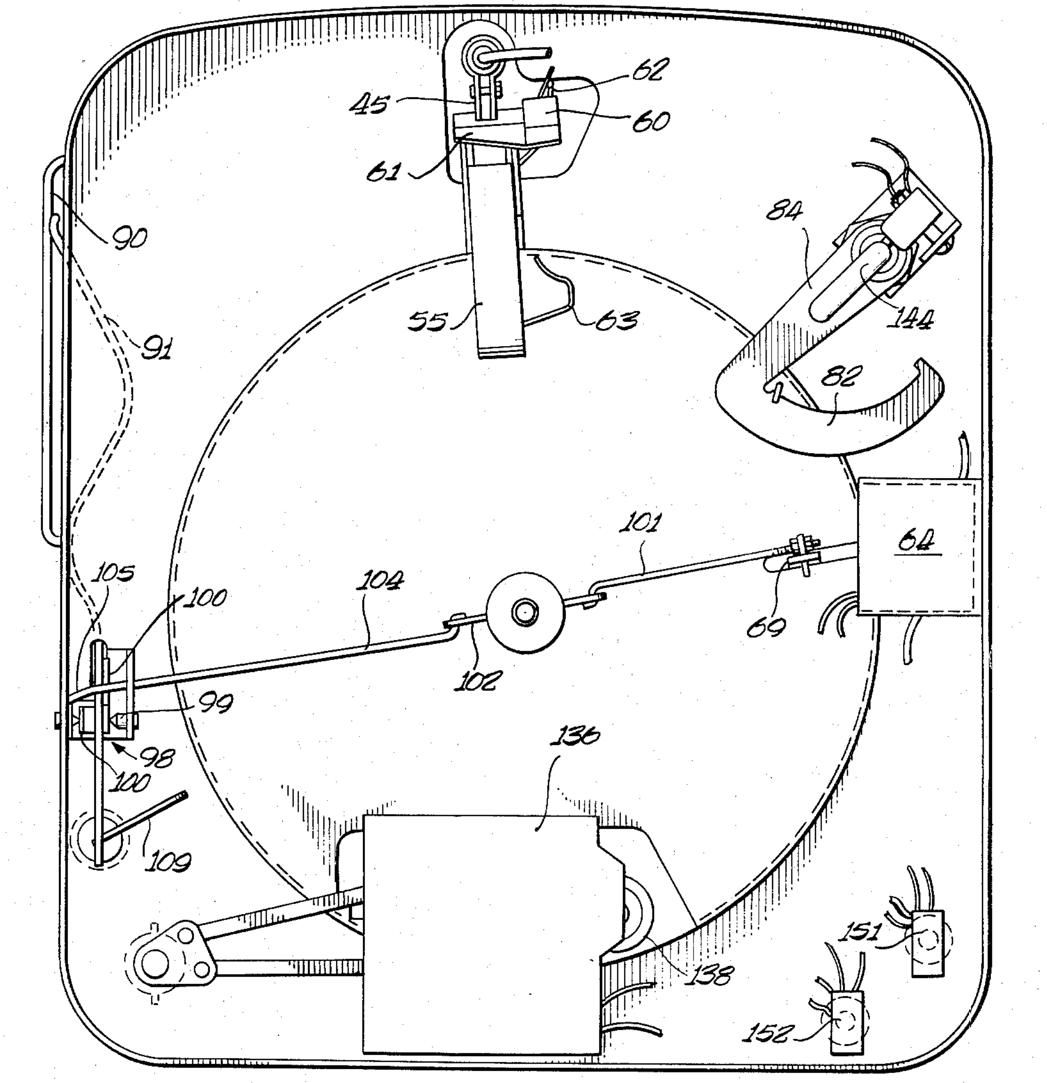
Fig. 4 is a bottom view of the record changer shown in Fig. 3.

Each time the record changer completes a cycle, the shiftable guide rail assembly 91 is oriented in its operative position. Its subsequent action will be best understood by reference to Figs. 4 and 6. The guide rail 91 is pivoted about a pivot assembly 98. The point pivot assembly 98 contemplates a pair of points 99 secured to the frame 52 which in turn contact the base of the shift finger 100. When the solenoid 64 is energized, its action is translated into a push of the spindle drive rod 101. Since the spindle drive rod 101 is secured to the spindle shaft cam 102 the shift drive rod 104, secured at the other end of the shaft cam 102, is similarly thrust outwardly. This action moves the hooked end portion 105 of the shift drive shaft 104 out of engagement with the shifting finger 100, thereby unlocking one element of the dual lock imposed upon the inner guide rail 91. Referring now to Fig. 26, it will be seen that the sensing assembly 30 contemplates an elongated sensing hook 106 with a barbed head 108 and J-shaped base 109. The finger assembly 106 is pivoted at the pivot pin 110 so that if a large 12-inch record 14 is dropped, it contacts the cammed face 111 of the barbed head 108 and pivots the finger assembly 106 about the pivot pin 110 releasing the guide rail rod 91 from the shoulder 112. This permits the guide rail to shift about its point pivot assembly 98 and drop out of position so that the pick-up head will follow the curvature of the outer guide rail 90 and be in a position to play the 12-inch record which has just been dropped.

As the cycling is concluded the hooked end portion 105 of the shift rod 104 re-engages the shift finger 100 which lowers the guide rail rod end back into position below the shoulder 112 at the base of the sensing finger 106 which then drops in a locking position above the guide rail 91 thereby locking the guide rail 91 in its operative position. Then, if a 10-inch record is dropped, the sensing head 108 of the finger 106 is not contacted, thereby leaving the inner guide rail 91 in its upper or active position to guide the pick-up head 26 into position for play on a 10-inch record 12.

The center of gravity of the sensing finger 106 accomplished by the overhung portion of its base 109 is such as to always tilt the sensing head 108 centrally into position to contact the rim of a 12-inch record if dropped.

*Spindle and stabilizer assembly*

Figure 5:
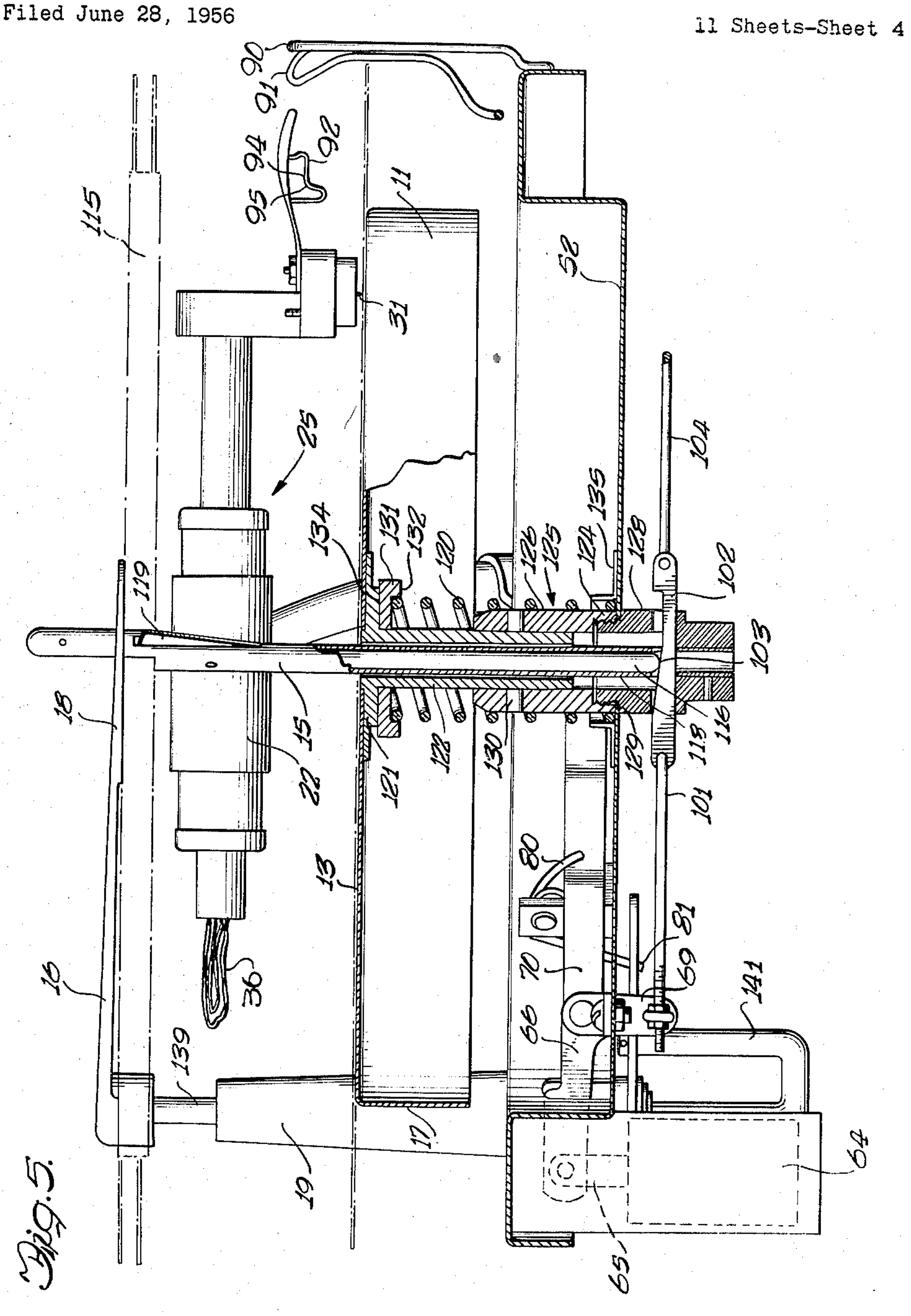
Fig. 5 is a transverse sectional view of the record changer taken along section line 5—5 of Fig. 2.

The record stack 115 is supported on spindle assembly 15 and stabilized in this position by means of a hooked end 18 of the stabilizer arm 16. The spindle assembly 15 may be of several known constructions, for example, like that shown in U.S. Patent 2,291,158. In the present instance the spindle assembly 15 is activated by means of a shaft cam 102, presenting cam surface 103 which contacts the base of the inner spindle shaft 116. The inner spindle shaft 116 moves upwardly with relation to the spindle sleeve 118 (as shown in Fig. 5) and this action activates the record release from the finger 119 in such a manner as to drop one record at a time on the turntable.

As mentioned before, the stabilizer arm assembly 116 holds the record stack 115 in a position parallel to the turntable 11 while the records are successively dropped onto the turntable.

Figure 7:
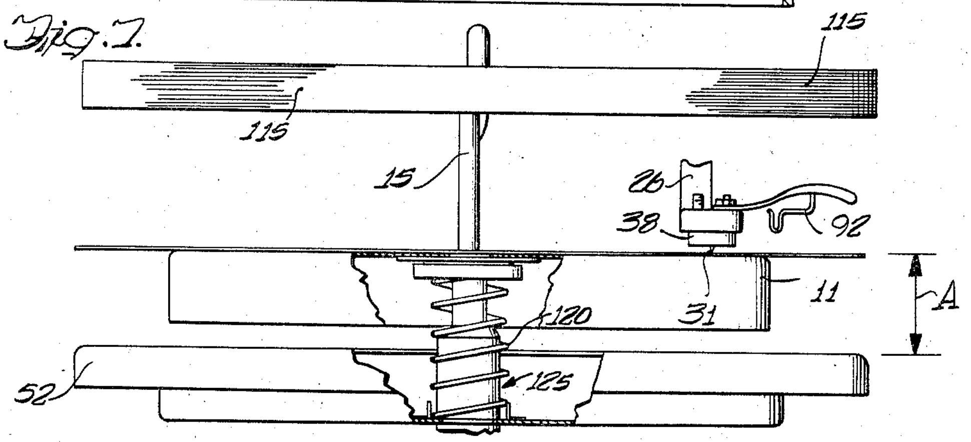
Fig. 7 is a partially broken enlarged section showing the turntable support mechanism when a single record is being played.
Figure 8:
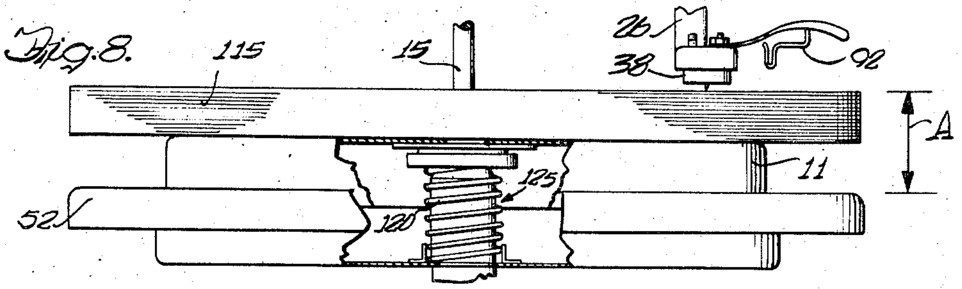
Fig. 8 is the same view as Fig. 7 showing the operation of the turntable support mechanism after a stack of records has been dropped onto the turntable.

Referring now to Figs. 7 and 8 it will be seen that as the stack of records 115 progressively moves from support spindle 115 to the turntable 11 the level of the turntable is progressively lowered by means of the compression of the helical turntable compression spring 120. The capacity of the compression spring 120 is calculated so that the level of the record which is being played will remain relatively the same with relation to the orientation of the swing arm assembly 20. In this manner any error introduced by a caster angle of the stylus 31 on the record is minimized since the needle 31 impinges vertically on each record throughout the stack 115.

*Turntable*

The turntable 11, as shown in Fig. 5, contemplates a flat upper surface 13 and a rim portion 17. To the flat upper portion at its center is welded a hollow spindle 121 with a main shaft portion 122. The main shaft portion 122 of the turntable spindle 121 is journaled within the turntable bearing assembly 125. The turntable bearing assembly 125 is secured to the changer frame 52 at the threaded joint 124 between the upper portion 126 and lower portion 128 of the turntable bearing assembly 125. As will be seen, a mating threaded undercut is provided at the threaded assembly 124 between the upper and lower portions of the turntable bearing which form a cylindrical compressible slot 129 to engage the main frame 52. A transverse locking hole 130 is provided in the upper portion of the turntable bearing assembly 125 to assist in securing the threaded joint 124. It will be appreciated that the size of the spindle 122 and the extent of its penetration into the turntable bearing assembly 125 will be occasioned by those proportions which reduce the rumbling characteristics of the turntable 11 to a minimum and yet do not prohibitively increase the cost of turntable support assembly.

In addition to the journal bearing assembly, a thrust bearing assembly is provided which operates in cooperation with the self-leveling spring 120. The upper thrust-bearing 131 is in the form of a washer having a lower shoulder 132. The lower shoulder 132 provides a recessed annulus into which the self-leveling spring 120 is inserted. The interface 134 between the spindle bearing shoulder portion 132 and the thrust bearing 131 is of sufficient size to additionally preclude any rumbling characteristics imparted to the turntable 11. The lower end of the coil spring 120 rests within a coil spring retaining ring 135 which is secured to the frame 52 of the changer by means of welding or suitable fastening techniques.

Figure 6A:
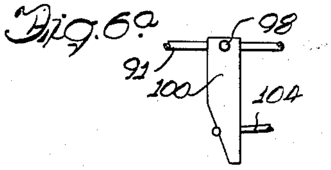
Fig. 6A is a partial view in enlarged scale of the guide rail tripping mechanism shown in front elevation.
Figure 6B:
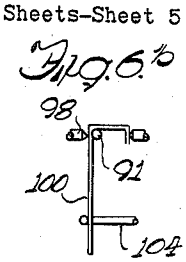
Fig. 6B is an end view of the guide rail tripping mechanism shown in Fig. 6A.
Figure 6:
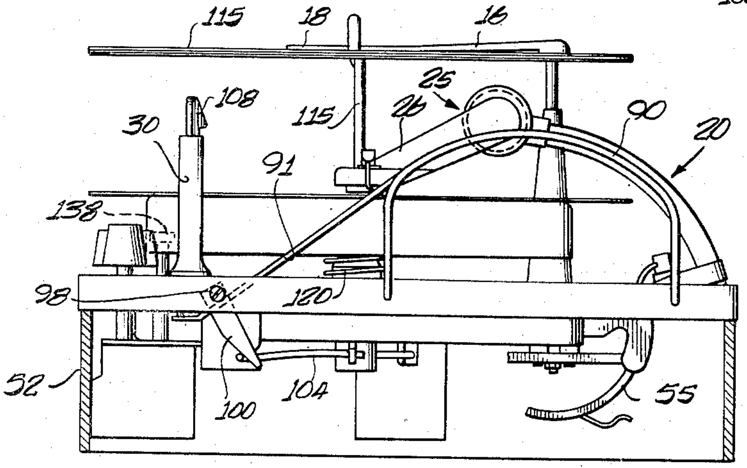
Fig. 6 is an end view in reduced scale of the changer as shown in Fig. 3, being viewed from the right end of Fig. 3.

The turntable 11 is powered for rotation by means of a motor drive assembly 136 which drives a friction wheel 138. The friction wheel 138, in turn, impinges upon the inner portion of the rim 17 of the turntable thereby rotating the turntable 11. It will be appreciated that variable drive means can be employed in order to drive the friction wheel 138 at different speeds thereby accommodating different speed records for use on the turntable. Also it will be appreciated, as best illustrated in Fig. 6, that the drive wheel 138 will efficiently rotate the turntable 11 irrespective of whether the turntable is at its high or low position, depending upon the location of the stack of records 115.

*Run-out record removal and manual play mechanism*

After the last record in a stack has played, it is a desirable feature when the record changer will turn off automatically. The heart of this control is in the stabilizer arm assembly shown in Fig. 25. There it will be seen that the stabilizer arm 16 is fixed to a stabilizer control shaft 139 which extends down through the stabilizer shaft support post 19. As will be seen the stabilizer support post is secured to the frame 52 by means of stabilizer support post lock nut 140. The lower portion of the stabilizer support post 139 is bent into a J-shaped assembly, the vertical leg 141 of which extends upwardly through the stabilizer control arm 84 and its motion relative to the arm 84 being limited by means of a cotter key 142. In this manner, the motion of the return spring 76 locking cam 82 is coordinated with the movement of the stabilizer bar 16.

After the last record of the stack is dropped thereby removing the support for the stabilizer bar 16, the stabilizer bar 16 drops to its lowest position as illustrated in Fig. 25. When it hits this lowest position, the lower edge 144 of the stabilizer bar shaft 139 contacts the control button 145 of the run-out switch 146. So long as the run-out button 145 is depressed, the circuitry, which will be described in detail hereinafter, is such that when the snap-action switch 60 is tripped by the control finger 62, the entire circuit is opened and the play stops.

Figure 2:
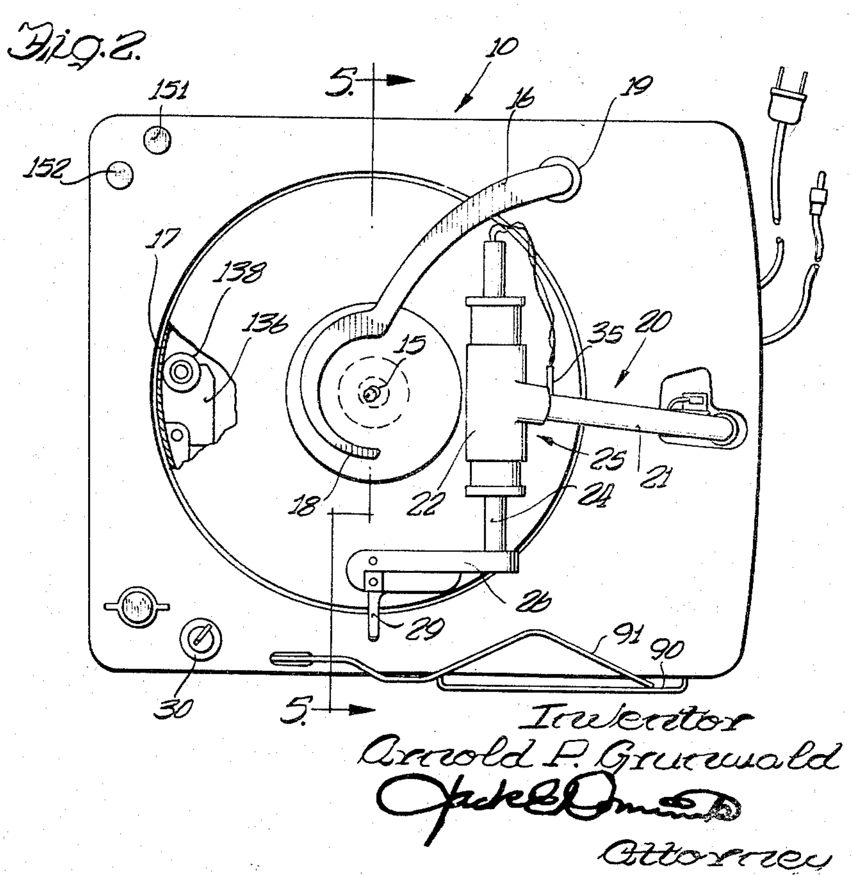
Fig. 2 is a top view of the record changer shown in Fig. 1.

At this point it either becomes desirable to play records manually or to remove the stack 115 from the turntable 11 and play another stack. This is accomplished by turning the stabilizer arm 16 from the play position as shown in Figs. 1 and 2 to the removable position as shown in Fig. 3. As this action takes place, the cam surface 82 of the stabilizer lower arm assembly 84 moves to a point where the end of the one leg 80 of the helical torsion spring 76 rides in the detent 83 of the cam surface 82. The cam surface 82 is so proportioned that this action releases the tension on the spring 76. As pointed out above the two tension springs 76, 86 employed to return the swing arm assembly 20 must operate together in order to accomplish the return. Therefore, with the helical spring 76 released by the turning action of the lower stabilizer arm assembly 84 the swing arm assembly may be retracted manually and will not spring up into the play position. At this point, of course, the operator can remove the stack of records 115 from the platter 11 and up the spindle assembly 15 and place a different stack of records in position whereupon the stabilizer arm 16 is brought back into position. This action by virtue of the cooperation of the cam surface 82 of the lower stabilizer arm assembly 84 with the helical tension spring 76 leg 80 returns the full spring load to the spring arm assembly 20 and brings the tone arm assembly back into position to play.

*Alternative swing arm drive assembly*

Figures 11, 11A:
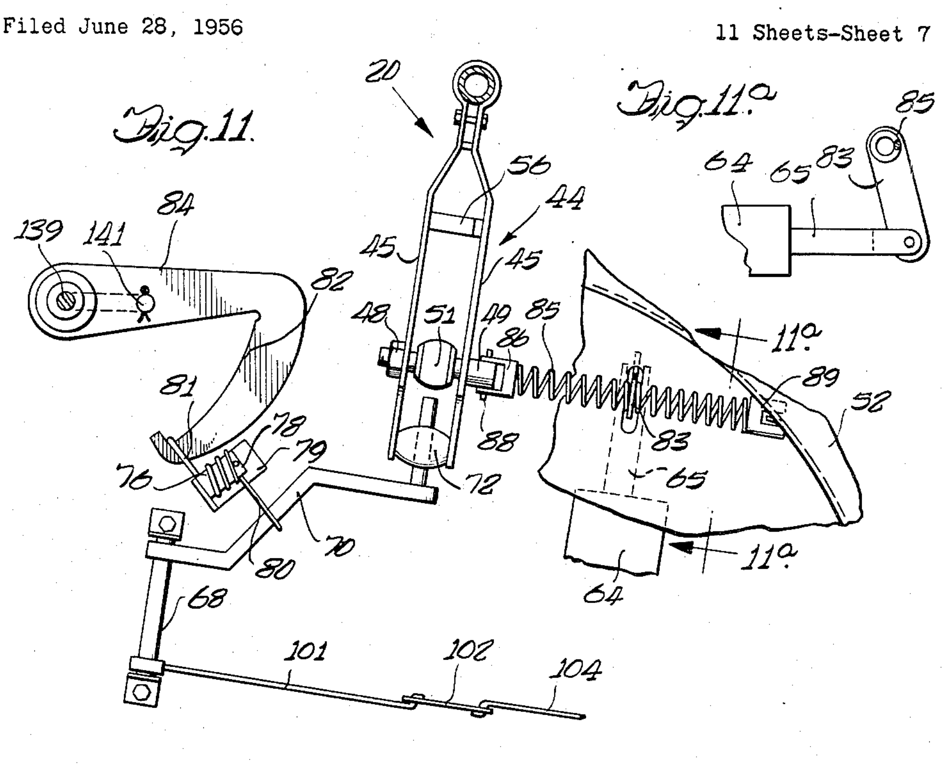
Fig. 11 is a diagrammatic plan view of an alternative form drive mechanism with certain parts removed for clarification.
Fig. 11A is a partial sectional cut-away view of the drive mechanism shown in Fig. 11 taken along section line 11A—11A of Fig. 11.

Referring now to Figs. 11, and 11A, it will be seen that the solenoid drive of the swing arm assembly 20 may be applied at a different point in the mechanical linkage. In this instance the solenoid 64 is oriented horizontally with its plunger 65 on a horizontal axis. The plunger 65 is secured to a drive link 83 which in turn is coupled to a mid-point of the return spring 85.

The utility of this mounting will be best understood in the light of its operational theory. An alternating current solenoid while energized may operate with an undesirable hum or buzz, particularly if the load is high or the stroke is long. If the solenoid must move a substantial mass, this action may take place. If, however, the solenoid is so linked to the mechanical assembly that the mass moved is minimized, then the stroke will be quick and the undesirable noise is reduced.

By coupling the solenoid directly to the return spring 85, only the mass of the spring is moved by the solenoid. One portion of the return spring serves to retract the swing arm assembly when the solenoid is energized, the other portion being potentially energized for the return. When the solenoid is then deenergized, the energized portion of the return spring 85 drives the swing arm assembly 20 back to the playing position. When the return spring 85 is driven from a mid-portion, its action in returning the swing arm assembly 20 to the playing position is uniform and steady, thus reducing tendencies to develop shock loads at the end of the stroke.

*Electrical circuit*

Figure 27:
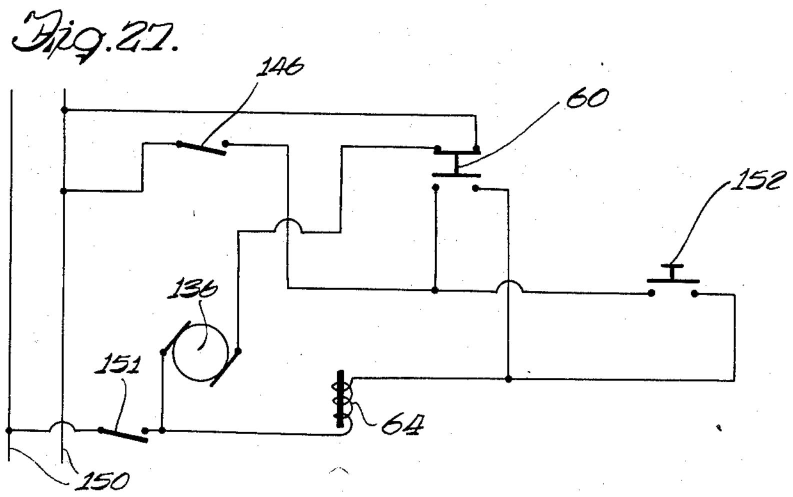
Fig. 27 is a schematic view of the wiring diagram of the component electrical elements of the phonograph record changer.

Referring now to Fig. 27 it will be seen that the circuitry contemplates an ordinary pair of household lines 150 which is normally 115 volts at 60 cycles. The on-off switch 151 is coupled directly to the first lead-off wire from the line circuit and transmits the current to the motor 136 when closed. The snap-action control switch 60 is positioned in such a manner that the motor circuit is opened or closed by its movement. In addition, the snap-action switch is so coupled to the circuitry that when the motor circuit is open, the circuit energizing the retraction mechanism solenoid 64 is closed. The cut-off switch 146, which is actuated to the open position by dropping of the stabilizer arm 16, or the moving of the stabilizer arm 16 out of the automatic position, is coupled within the solenoid circuit, and has an overriding action, that is, at any time when the stabilizer arm 16 is in the dropped or manual play position, the solenoid 64 cannot be energized. Obviously this action orients the changer for manual play at any time when a stack of records is not on the spindle mechanism 15.

The final switch in the circuit is the reject switch 152. This switch is spring loaded, so that the operator will only close the solenoid circuit for a short period of time. When the reject switch 152 is energized the solenoid 64 is energized and immediately retracts the swing arm assembly 20 thereby cycling the unit and dropping the next record for play, irrespective of the position of the stylus on the record being played. Since the stabilizer arm switch 146 is an over-ride on the entire solenoid circuit, the reject switch 152 has no effect when the unit is being played manually.

ALTERNATIVE EMBODIMENT

The foregoing embodiment of the invention, described in considerable detail, employed a unique type tone arm assembly which operates on the radial principle. Within the spirit and scope of the invention, however, it is possible to employ a conventional pivoted type tone arm within the same record changer environment. Although the details of construction of such a unit will not be described here, the diagrammatic drawings of the alternative embodiment are shown in Figs. 28 through 31, inclusive.

Figure 28:
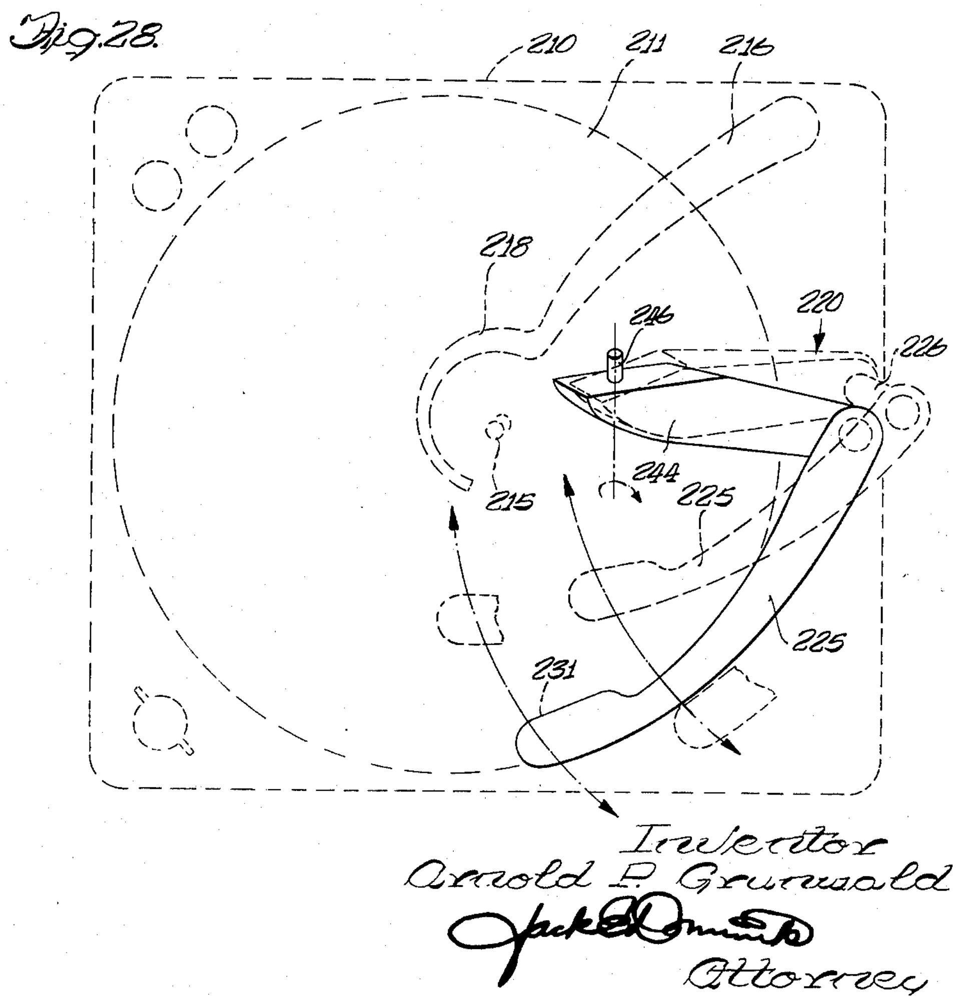
Fig. 28 is a diagrammatic top view of an alternative embodiment of the record changer employing a pivotal tone arm.
Figures 29, 30:
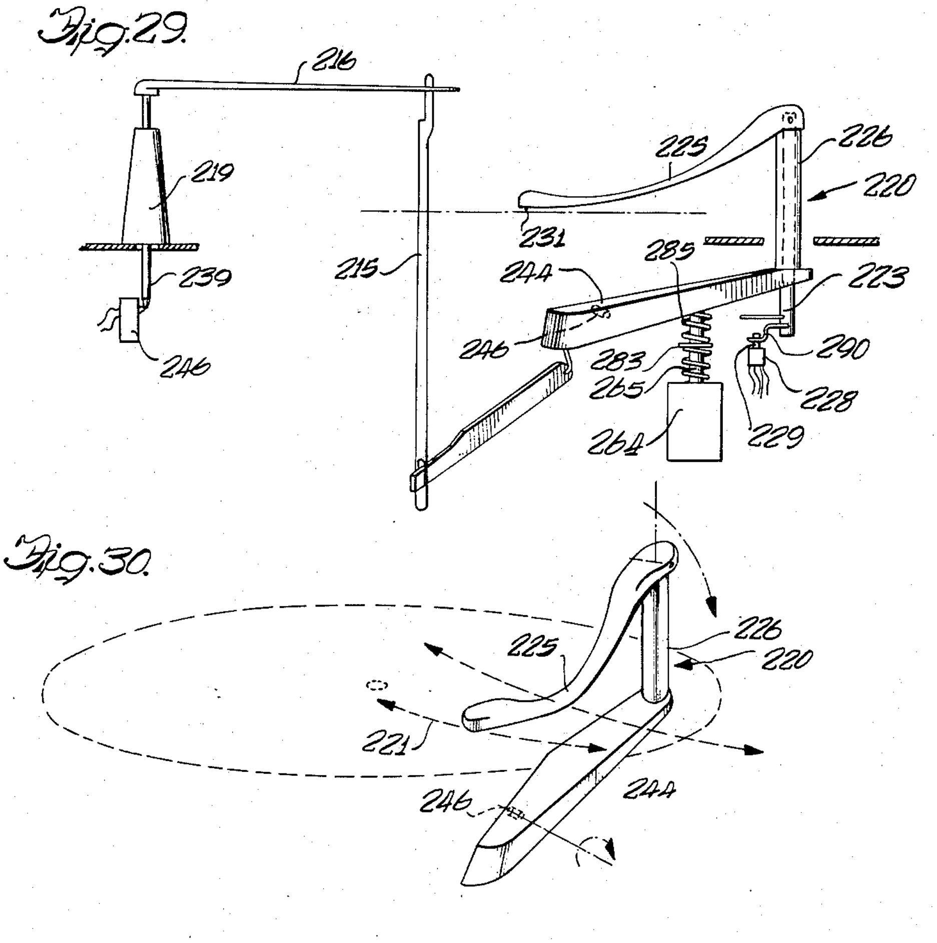
Fig. 29 is a diagrammatic presentation of the assembled relationship of the components of the alternative embodiment record changer employing a pivotally mounted tone arm.
Fig. 30 is a diagrammatic perspective view of the alternative embodiment showing the tone arm in its playing position.

Referring now to Fig. 28 it will be seen that the record changer unit 210 includes a turntable 211 and a swing arm 216 with a hooked end portion 218 for engaging the stack of records which ride on the spindle assembly 215. The tone arm assembly 225 is pivoted vertically at its rear portion on pivot post 226 which in turn is secured to a balance arm 244. The tone arm 225, support post 226, and balance arm 244 together make up the alternative swing arm assembly 220.

The balance arm 244 is pivoted about a pivot pin 246 at its forward portion. The pivot pin is rotated with respect to the mean effective playing locus of the stylus 231. The axis of the pivot 246 is also tilted with respect to the mean effective playing locus of the playing stylus 231. The angles of rotation and tilt are similar in character to those described in connection with the preferred embodiment shown in Fig. 12 of the accompanying drawings.

Figure 31:
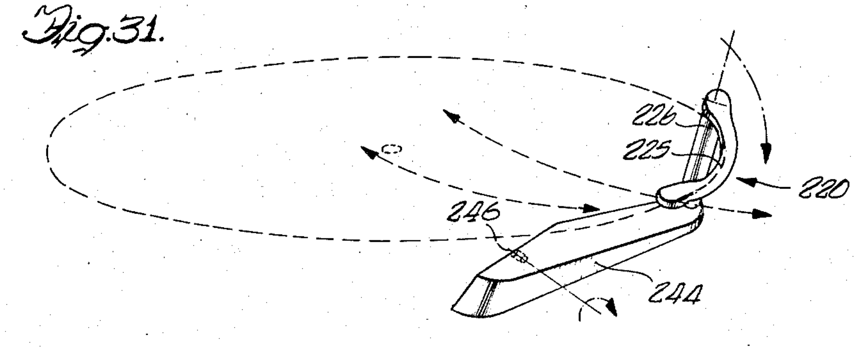
Fig. 31 is a view of the alternative embodiment similar to Fig. 30 but showing the pivotally mounted tone arm in its retracted position.

The additional components employed are also similar to the preferred embodiment. For example, in Fig. 29, it will be seen that the stabilizer arm 216 is supported by a stabilizer post 219 and the stabilizer support shaft 239 activates the cut-off switch 246. The spindle assembly 215 operates in a similar manner to that shown in the preferred embodiment. The solenoid 264 has a plunger 265 which is co-axial with a coil spring 285, and connected to the balance arm 244. The coil spring 285 is of such a capacity that the balance arm 244 is normally pivoted around its axis 246 with the swing arm assembly 220 in playing position. When the solenoid 264 is energized the swing arm assembly 220 is pulled downwardly and the tone arm 225 swings toward the perimeter of the record as illustrated in Fig. 31.

When the coil spring 285 is engaged at a midpoint by drive pin 283, its operation is similar in principle to that outlined above in the alternative embodiment of the swing arm assembly drive. It differs only in that the spring 285 is divided into portions of tension and compression loading as distinguished from a clockwise and counterclockwise torsional loading.

The guide rail features to control the travel of the tone arm and other significant operational systems are similar to that described above on the preferred embodiment. For example, the switch 228 serves to energize the solenoid 264 when actuated by control finger 291 pressing against the switch tab 229. This action occurs when the stylus 231 travels in the runout groove. After the retraction and tone arm transfer, the return control finger 290 throws the switch tab 229 deenergizing the solenoid and permitting the spring 285 to return the swing arm assembly to the playing position.

SUMMARY

In review it will be seen that both the preferred and alternative embodiments of record changers owe their operation to a unique angularity of the tone arm suspension which invites the forces of gravity to accomplish the tone arm transfer in timed relation to the dropping of records from the spindled stack onto the turntable. The changer mechanism is particularly unique that it is both adaptable to a radial and conventional pivotal tone arm.

Because the complex clockwork mechanism for accomplishing record change in a conventional record changer is eliminated, a turntable can be heavily journaled to eliminate rumble, and additionally spring-loaded to be self-leveling in operation.

Although independent power means for the retraction has been shown, it is contemplated that a flexible shaft drive from the turntable motor with a suitable clutch arrangement could be made to accomplish the retraction, thereby eliminating the cost of a solenoid from the mechanism. It is also contemplated that other types of radial tone arms could be employed, for example, the variety which contemplates a pair of fixed rails on which the cartridge assembly moves in overhead trolley-like fashion.

Although the entire host of advantageous features of the invention can only be appreciated by a detailed study of this preferred embodiment, it will be readily apparent that the mechanism will produce a greater fidelity of reproduction due to the elimination of tracking error, the self-leveling of the record stack, and reducing the rumble normally associated with turntables which are not sturdily journaled for rotation. In addition, the mechanism is inexpensive to construct, and can be made to cycle in one to two seconds as opposed to conventional cycle which interrupts play between records for ten seconds or more.

Although particular embodiments of the invention have been shown and described in full here, there is no intention to thereby limit the invention to the details of such embodiments. On the contrary, the intention is to cover all modifications, alternative embodiments, usages and equivalents of the automatic record changer and player as fall within the spirit and scope of the invention, specification, and appended claims.

I claim as my invention:

1. A record changer comprising, in combination, a turntable, a frame, a tone arm, a swing arm support for the tone arm, means pivotally securing the swing arm support to the frame to rotate rearwardly and downwardly thereby retracting the pickup arm, means coupled with the pivotal support permitting the swing arm to flop when the center of gravity shifts as the stylus enters the runout groove of the record, a cycling switch engageable by the swing arm when the swing arm support flops, the tone arm being mounted for movement transversely with respect to the swing arm, the tone arm being so balanced on the swing arm that when a record has been played the swing arm flops in its support and trips the cycling switch thereby beginning the cycling action.

2. A record changer comprising, in combination, a turntable, a chassis, a tone arm, a swing arm support for the tone arm, the swing arm support being universally pivoted to the frame to rotate rearwardly, a guide arm secured to the swing arm, guide arm restraining means secured to the frame, the guide arm and restraining means being proportioned to allow the swing arm to flop when in the run out position, a cycling switch engageable by the swing arm when the swing arm flops, the tone arm being mounted for movement transversely with respect to the swing arm the tone arm being so balanced on the swing arm that when a record has been played the swing arm center of gravity shifts thereby tilting the swing arm and tripping the cycling switch to begin the cycling action.

3. In a record changer in which the tone arm is retracted as records are dropped from a stack to a turntable and the retracted tone arm is actuated by gravity from the runout to the starting rim positions, an intermixing assembly for two diameter sizes of records comprising, in combination, a guide rail engaging element on the tone arm, a shiftable guide rail, the guide rail being proportioned and oriented to cooperate with the tone arm guide rail engaging element to guide the tone arm into playing position on the smaller of the two sized records, a record diameter sensing finger, means coupling the sensing finger to shift the guide rail out of contact with the tone arm guide rail engaging element when a large diameter record has been dropped, and tone arm stop means limiting the gravity inspired lateral translation of the tone arm to a point which insures contact on the larger record when the tone arm returns from its retracted position.

4. In a record changer in which the tone arm is retracted as records are dropped from a stack to a turntable and the retracted tone arm is actuated by gravity from the runout to the starting rim positions, an intermixing assembly for two diameter sizes of records comprising, in combination, a guide rail engaging element on the tone arm, a shiftable guide rail, the guide rail being proportioned and oriented to cooperate with the tone arm engaging element to guide the tone arm into playing position on the smaller of the two sized records as the tone arm returns from its retracted position, a record diameter sensing finger, means coupling the sensing finger to shift the guide rail out of contact with the tone arm guide rail engaging element when a large diameter record has been dropped, a second means returning the guide rail to the operative position after each record has dropped, and tone arm stop means limiting the gravity inspired lateral translation of the tone arm to a point which insures contact on the larger record when the tone arm returns from its retracted position.

5. In an automatic record changer having a retractable tone arm for playing a stack of records dropped sequentially onto a turntable, an automatic lockout assembly to convert the unit for manual play comprising, in combination, driving means for retracting the tone arm, yieldable means energized by the tone arm retraction which serve to return the tone arm, a stabilizer bar oriented atop the stack of records, a shaft secured to the stabilizer bar translating a turn of the stabilizer bar to an area below the turntable, cam means fixed to the shaft and engaging the yieldable tone arm return means so that when the stabilizer bar is removed from its position atop the stack of records the yieldable tone arm return means is deactivated.

6. In an automatic record changer having a rearwardly retractable tone arm for playing a stack of records dropped sequentially onto a turntable, an automatic lockout assembly to convert the unit for manual play comprising, in combination, driving means for retracting the tone arm, yieldable means energized by the tone arm retraction which serve to return the tone arm, a stabilizer bar oriented atop the stack of records, a stabilizer bar support, a shaft journaled within the support translating a turn of the stabilizer bar to an area below the turntable, cam means fixed to the shaft and coupled to the yieldable tone arm return means, the cam means being proportioned to increasingly unload the yieldable means as the stabilizer bar is rotated from atop the stack of records thereby deactivating the tone arm return when the stabilizer bar is swung out of action from atop the record stack.

7. In an automatic record changer having a retractable tone arm for playing a stack of records dropped sequentially from a spindle onto a turntable, an automatic lockout assembly to convert the unit for manual play comprising, in combination, driving means for retracting the tone arm, yieldable means energized by the tone arm retraction drive which serve to return the tone arm, a stabilizer bar oriented atop the stack of records, for lateral swinging, a stabilizer bar support, a shaft journaled within the support translating a swing of the stabilizer bar to an area below the turntable, an arcuate cam fixed to the shaft below the turntable and coupled to the yieldable tone arm return means, the cam being proportioned so that when the stabilizer bar is removed from its position atop the stack of records the yieldable tone arm return means is deactivated.

8. An automatic phonograph record changer and player comprising, in combination, a frame, a turntable journaled for rotation on the frame, a tone arm, a swing arm assembly supporting the tone arm for movement transversely thereof, a pivot mount securing the swing arm assembly to the frame for retraction, the pivotal axis being tilted with respect to the turntable so that the tone arm experiences a gravity assisted return to the starting position when the swing arm is retracted, driving means for retracting the swing arm assembly, cycling control means responsive to the tone arm travel to the runout portion of the record to energize the retraction driving means, guide rail engaging means on the tone arm, a guide rail engaged by the tone arm to guide the tone arm back to the starting point on the record, record diameter sensing means, guide rail shifting means responsive to the sensing means to shift the guide rail out of action depending upon the diameter of the record dropped, a spindle extending upwardly from the turntable to support a stack of records, record release means on the spindle to release one record at a time, and a linkage actuated by the tone arm retraction drive means which also actuates the record release means and guide rail in timed relation.

9. In a record changer of claim 8 above, a torsion spring driven swing arm return, the swing arm drive being applied at a midpoint of the torsion spring.

10. In a record changer of the character defined in claim 8 above, a self leveling turntable having a spring loaded pivot, the spring capacity being calculated to lower the turntable such a distance as successive records are dropped as to maintain the top of the record being played at a substantially fixed level.

11. In a record changer of the character defined in claim 8 above, a radial tone arm having a single supporting bar for the pickup head and journaled in a bearing and a bearing support secured to the end of the swing arm.

References Cited in the file of this patent

UNITED STATES PATENTS

| | | |
|---|---|---|
| 1,349,636 | Swing | Aug. 17, 1920 |
| 1,983,941 | Mallina | Dec. 11, 1934 |
| 1,993,073 | Nystom | Mar. 5, 1935 |
| 2,085,582 | Guedon | June 29, 1937 |
| 2,291,158 | Holstensson | July 28, 1942 |
| 2,476,715 | Falk | July 19, 1949 |
| 2,515,273 | Snepvangers | July 18, 1950 |
| 2,527,586 | Small | Oct. 31, 1950 |
| 2,616,705 | Leonard | Nov. 4, 1952 |
| 2,640,700 | Mortimer et al. | June 2, 1953 |
| 2,689,735 | Morrison | Sept. 21, 1954 |
| 2,695,786 | Vistain | Nov. 30, 1954 |

FOREIGN PATENTS

| | | |
|---|---|---|
| 906,087 | France | Dec. 21, 1945 |